United States Patent [19]

Grey et al.

[11] 3,934,734

[45] Jan. 27, 1976

[54] BALE WAGON

[75] Inventors: Donald M. Grey, Selma; Lee D. Butler, Kingsburg, both of Calif.

[73] Assignee: Sperry Rand Corporation, New Holland, Pa.

[22] Filed: Aug. 23, 1973

[21] Appl. No.: 390,971

Related U.S. Application Data

[62] Division of Ser. No. 139,324, May 3, 1971, abandoned.

[52] U.S. Cl................ 214/6 B; 214/8.5 G; 214/518
[51] Int. Cl.²......................................... B65G 57/32
[58] Field of Search.... 214/6 B, 6 BA, 8.5 R, 8.5 A, 214/8.5 G, 8.5 K, 8.5 SS, 518, 519, 152

[56] References Cited
UNITED STATES PATENTS

| | | | |
|---|---|---|---|
| 3,278,050 | 10/1966 | Tarbox | 214/6 B |
| 3,325,021 | 6/1967 | Burns et al. | 214/6 BA |
| 3,363,781 | 1/1968 | Magnetti | 214/6 BA X |
| 3,446,369 | 5/1969 | May et al. | 214/6 B |
| 3,502,230 | 3/1970 | Grey et al. | 214/6 B |
| 3,521,762 | 7/1970 | Walters | 214/6 B |
| 3,549,023 | 12/1970 | Backman | 214/6 B |
| 3,631,992 | 1/1972 | Dickinson | 214/6 B |

*Primary Examiner*—Robert J. Spar
*Assistant Examiner*—Leslie J. Paperner
*Attorney, Agent, or Firm*—John R. Flanagan; Frank A. Seemar; Joseph A. Brown

[57] ABSTRACT

A bale wagon adapted to pick up bales and form them into a composite stack and further adapted to unload individual bales from the formed stack in single bale fashion. The bale wagon basically comprises a load rack, a slightly forwardly inclined transfer table spaced forwardly of the load rack and moveable back and forth therebetween, and a vertically reciprocable receiving table interposed between the transfer table and load rack. During the loading mode of operation, the receiving table functions to transfer bales to the transfer table and after a complete tier has been formed thereon the transfer table moves rearwardly to a position adjacent the front end of the load rack where the tier is deposited. To unload, the transfer table is actuated rearwardly to the position adjacent the load rack, retrieves the end tier and moves back to its original position. The receiving table then operates through a series of cycles, retrieving a portion of the tier from the transfer table during each cycle while the complement of the tier is held by hooks which engage the lower layer of bales of the tier. At the end of each cycle of the receiving table, the retrieved bales are conveyed transversely from the bale wagon in single bale fashion.

6 Claims, 26 Drawing Figures

Fig 11

BALE WAGON

This is a division of application Ser. No. 139,324, filed May 3, 1971, now abandoned.

BACKGROUND OF THE INVENTION

This invention relates to agricultural machinery and more particularly to wagons adapted for loading and unloading bales of hay and the like.

One of the most significant advances made in agricultural mechanization over the past two decades was the development of the automatic bale wagon by G. E. Grey. G. E. Grey's bale wagon, commomly referred to as "the basic Grey Wagon" and described in U.S. Pat. No. 2,848,127, is principally adapted for stacking bales and is basically comprised of three tandemly arranged cooperating tables. In operation, the basic Grey wagon functions to pick up bales, form them into a composite stack, and subsequently discharge the entire stack in a storage area. Although the basic Grey wagon has met with wide acceptance especially in the more arid geographical regions where stacking can be done in open space without significant risk of spoilage, there has been an increasing need for the development of a bale wagon having single bale unloading capability, especially among hay farmers in the more humid geographical regions unsuited for open space stacking.

Various approaches have been taken in the development of a single bale unloading wagon. One such approach is represented in U.S. Pat. No. 3,448,879 to C. Van Der Lely. Van Der Lely's wagon, commonly referred to as a "random loading wagon", delivers bales to the wagon in random fashion—not in a composite stack as the basic Grey wagon does. To unload, the floor of the Van Der Lely wagon is driven rearwardly, causing bales to fall into a rear-transverse cross conveyor which conveys the bales to one side of the wagon. The obvious deficiency of this wagon is the lack of orderly control of the load during unloading, due in great part to the random disposition of the loaded bales.

The most successful single bale unloading wagon to date is that shown in U.S. Pat. No. 3,502,230 issued Mar. 24, 1970 to D. M. Grey, et al. This wagon employs the basic Grey three table concept but modifies the intermediate table by adding a cross conveyor and separating mechanism. Briefly pointing out the unloading operation, the stack is moved forwardly in small increments such that a tier at a time is pushed onto the intermediate table. The separating mechanism then separates a row of the tier and the separated row is conveyed transversely from the intermediate table by the cross conveyor. Although successful in most respects, this wagon does have a relatively low load capacity. Moreover, it is noted that the first table, essential for loading, is not utilized during unloading and that the modifications in the intermediate table, essential for unloading, are not utilized during loading.

SUMMARY OF THE INVENTION

The bale wagon of the present invention basically comprises a load rack, a forwardly inclined transfer table spaced forwardly of the front end of the load rack, and a receiving table disposed intermediately between the load rack and transfer table and moveable up and down therebetween for either delivering bales to the transfer table or receiving bales therefrom. During the loading operation, a layer of bales is received by the receiving table and the layer is then transferred to the transfer table. After a sufficient number of layers have been transferred to the transfer table to form a tier, the transfer table is then moved rearwardly over the receiving table to deposit the formed tier onto the front end of the load rack. The above loading steps are repeated until the load rack contains a load of side-by-side disposed tiers. To unload, the bale wagon employs the same basic elements as used in loading, i.e., load rack, transfer table, and receiving table. In the unloading operation, the transfer table is adapted to move to the load rack and retrieve a tier therefrom and return to its original position. The receiving table then proceeds to move up and down through a series of cycles, during each cycle retrieving a portion of a tier on the transfer table and bringing that portion of the tier down to its lower position where the bales are conveyed transversely in single file from the bale wagon. The receiving table continues to cycle until the entire tier disposed on the transfer table has been retrieved and conveyed from the wagon. The above unloading steps are repeated until the entire load has been discharged.

It is therefore the principal object of the present invention to provide a bale wagon adapted loading and single bale unloading which utilizes the same basic components for carrying out the loading and unloading operation.

A further object of the present invention is to provide a transfer table normally disposed in an upright, slightly forwardly inclined position which is moveable in a fore-and-aft direction between its original forward position and a rear position adjacent the front end of the load rack, the transfer table being further provided with retaining means for supporting a tier during loading and for retrieving a tier from the load rack during unloading.

Another object of the present invention is to provide a receiving table in a disposition intermediately between the forward position of the transfer table and the load rack and to provide the same receiving table with drive means for cycling the receiving table up and down relative to the transfer table such that bales during the loading operation will be delivered from the receiving table to the transfer table and during the unloading operation bales will be received from the transfer table by the receiving table.

Another object of the present invention is to provide control means for actuating the retaining means of the transfer table in timed relationship relative to the position of the receiving table during its cycle.

A further object of the present invention is to provide control means for actuating the retaining means of the transfer table during the transfer of bales to the load rack for deposit thereon and during the retrieving of a tier from the load rack by the transfer table.

A more general object of their present invention is to provide a high capacity single bale unloading wagon. Other objects and advantages of the present invention will become apparent and obvious from a study of the following description and the accompanying drawings which are merely illustrative of the present invention.

DESCRIPTION OF THE DRAWINGS

FIGS. 7 and 8 are fragmentary views of the single revolution clutch assembly for actuating the receiving table during both loading and unloading, FIG. 7 showing the clutch engaged while FIG. 8 shows the clutch disengaged.

DESCRIPTION OF THE PREFERRED EMBODIMENT

In the following description right hand and left hand reference is determined by standing at the rear of the bale wagon and facing in the direction of travel.

In General

Figure 1:
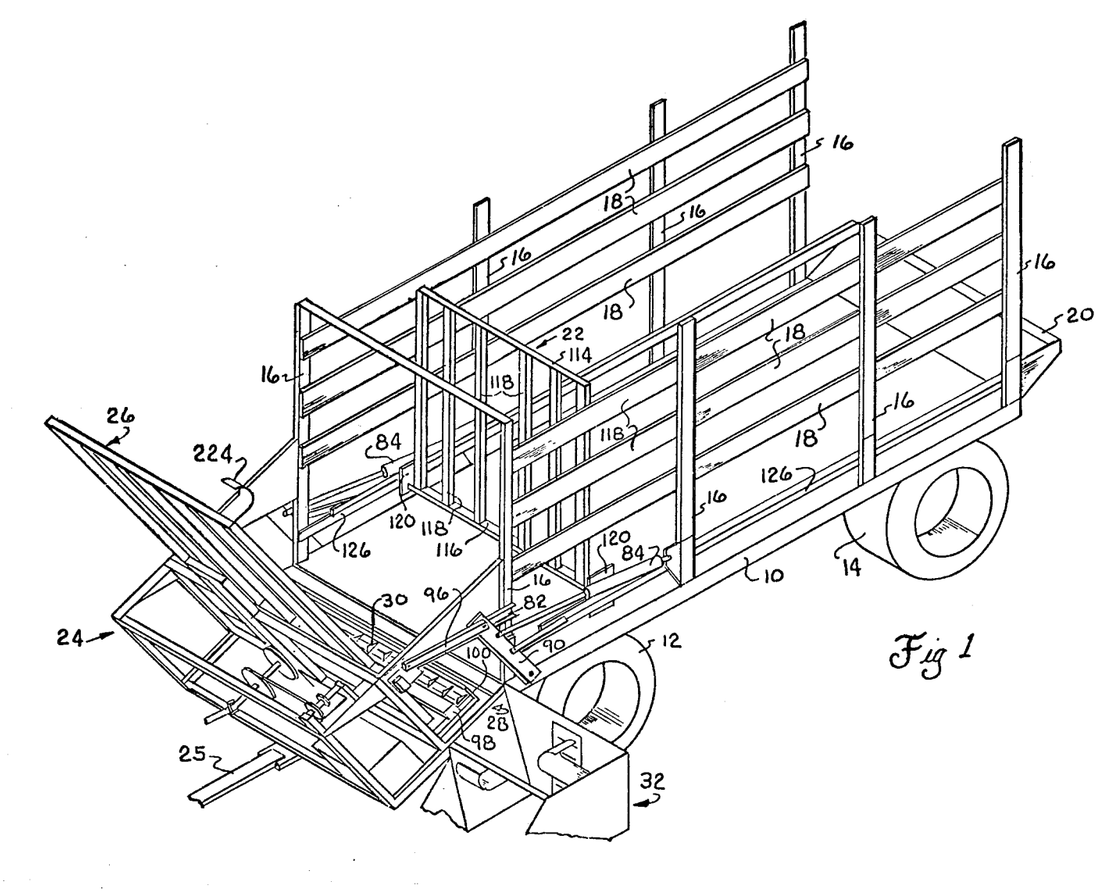
FIG. 1 is a perspective view of the present bale wagon drawn in accordance with the present invention.

With particular reference to FIG. 1, the bale wagon of the present invention is comprised of a wheel supported load rack 10, the front and rear left side wheels being indicated by the numerals 12 and 14 respectively. Spaced along intervals on the left and right hand side of the load rack 10 is a series of upstanding posts 16. The posts 16 support a series of longitudinally extending, vertically spaced apart side railings 18. Extending transversely the rear portion of the load rack is a retaining bar 20.

The load rack 10 further includes a rolling rack 22 which is moveable in a fore-and-aft direction along the load rack by carriage means disposed in a pair of laterally spaced longitudinally extending rails. Rolling rack 22 is adapted to move towards the rear of the wagon in increments corresponding to the thickness of a single tier during loading and is further adapted to move towards the front of the wagon in like increments during unloading.

Fixed to the front portion of the load rack 10 and extending forwardly and downwardly therefrom is a box frame 24 which supports the tier forming components and their associated drive units. Extending forwardly from the bale wagon is a tongue 25 having a clevis, not shown, which is adapted to be connected to the drawbar of a power source, not shown. It will be obvious to those skilled in the art that the present invention can likewise be incorporated into a self-propelled unit, obviating the necessity of having a tongue and clevis arrangement.

Disposed within box frame 24 is a slightly forward inclined transfer table 26 adapted to move back and forth with a carriage means that is confined in a pair of guide rails that extend between the box frame 24 and the load rack 10. The transfer table 26 includes a series of bale retaining means in the form of hooks which engage a lower portion of a tier of bales and retain it in an upright manner adjacent the transfer table 26.

Interposed between the load rack 10 and the transfer table 26 is a receiving table which is reciprocably moveable up and down adjacent the transfer table 26 for delivering bales thereto or receiving bales therefrom. A bale pickup mechanism 32 is disposed to the left side of receiving table 28 and is so arranged to pick up bales from the field and deliver them to the receiving table by a conveyor means 30. The pickup mechanism 32 forms no material part of the present invention and therefore is not described in great detail. Various types of the bale pickup mechanisms may be suitably employed in a bale wagon of the type shown herein. Those skilled in the art and those who are not can find detailed teachings of pickup mechanisms in U.S. Pat. Nos. 3,367,522 and 3,543,958.

As will be described hereafter in greater detail, the transfer table 26, rolling rack 22, and hooks (indicated generally by numeral 46, 48 in FIG. 5) are powered hydraulically while the receiving table 28 is mechanically driven. To effectuate the sequential operation of these components during loading and unloading it is necessary to provide various sensing and trip mechanisms and link them with the control means of the respective components. Some of these linking mechanisms, although particularly described, are not shown because they are not considered material to the present invention and certainly fall within the skill of individuals engaged in the art.

Transfer Table

Figure 4:
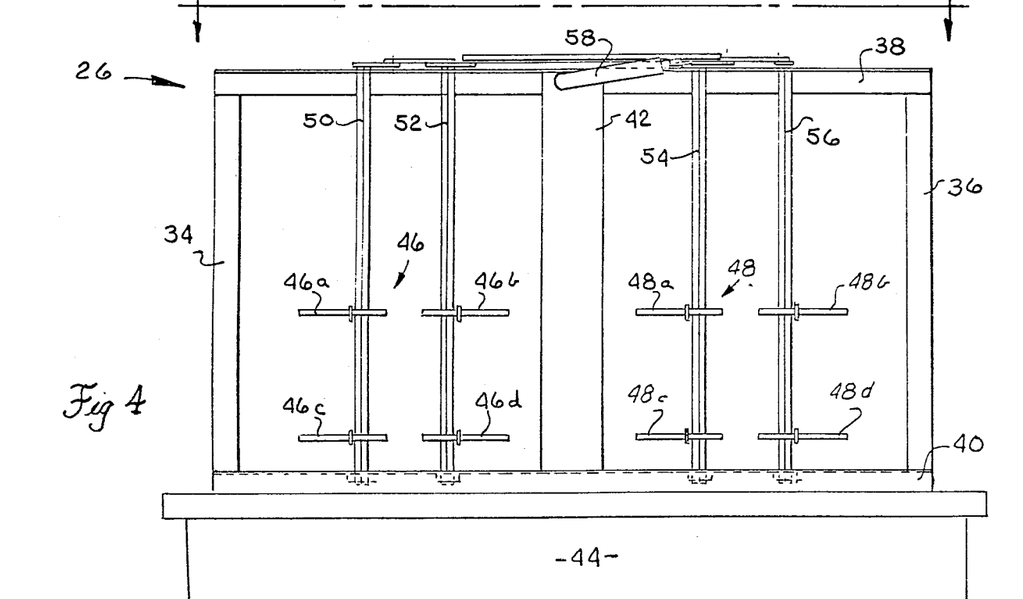
FIG. 4 is a rear elevational view of the transfer table.

The upper portion of transfer table 26, as best seen in FIG. 4, is of a generally open rectangular construction having like side members 34, 36 joined at their end extremeties by upper and lower cross members 38, 40 respectively. A center support 42 extends between the medial portions of the upper and lower cross members 38, 40. The lower portion of transfer table 26 includes a transversely extending pusher plate 44 which depends downwardly from the lower cross member 40 and is co-planar with the upper, open rectangular construction.

Figure 5:
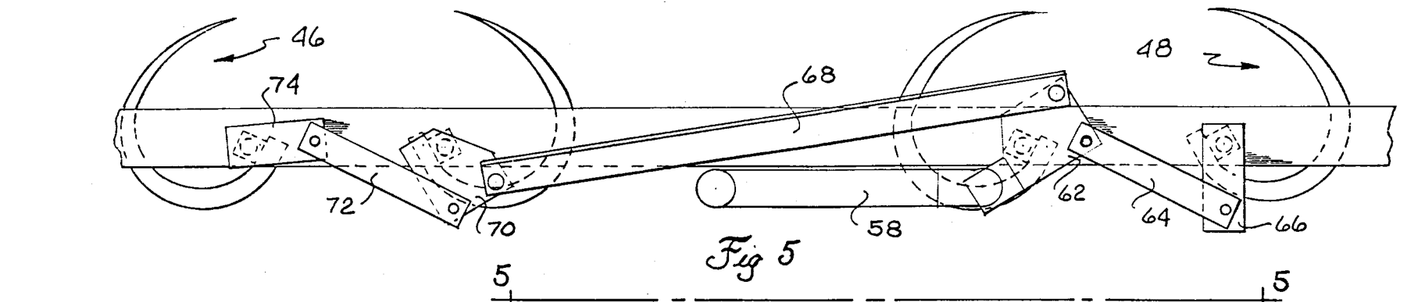
FIG. 5 is a plan view of the transfer table shown in FIG. 4.

Disposed about the transfer table 26 in lateral spaced apart relationship just above lower cross member 40 is a first and second set of hooks 46, 48, each set of hooks being spaced a distance slightly greater than a bale height above the receiving table 28 and adapted to grasp and retain a bale of hay against the rear face of the transfer table 26. More particularly each set of hooks include 4 individual hooks, the individual hooks of set 46 being denoted by 46a, 46b, 46c, 46d, and likewise, the individual hooks of set 48 being indicated by 48a, 48b, 48c and 48d. As best seen in FIG. 4, each pair of vertically spaced hooks are axially aligned and are supported and actuated by a series of laterally spaced rocker arms 50, 52, 54 and 56. The rocker arms are journalled for rotative movement within upper cross member 38 and lower cross member 40. The rocker arms and consequently the individual hooks are actuated by a hydraulic cylinder 58 which is anchored to center support 42 and extends laterally therefrom where its rod end is operatively connected to a compound linkage arrangement that in turn actuates each of the rocker arms. Viewing the linkage particularly, in FIG. 5, it is seen that the rod end of the cylinder 58 is pivotally connected to plate 62 which is in turn fixed to rocker arm 54. Plate 62 is connected to plate 66 by a connecting link 64. Also plate 62 is connected to plate 70 by a tie link 68, with plate 70 being affixed to rocker arm 52. Plate 70 is connected to plate 74, which is fixed to rocker arm 50, by a connecting link 72. In order for the individual hooks to be engaged and disengaged it is obvious that the connecting links 64, 68 and 72 must be pivotally connected between the respective plates, as shown in FIGS. 4 and 5. Means, to be described in greater detail, are provided for actuating the hooks in timed relationship relative to the position of the receiving table 28 and transfer table 26.

Figure 2:
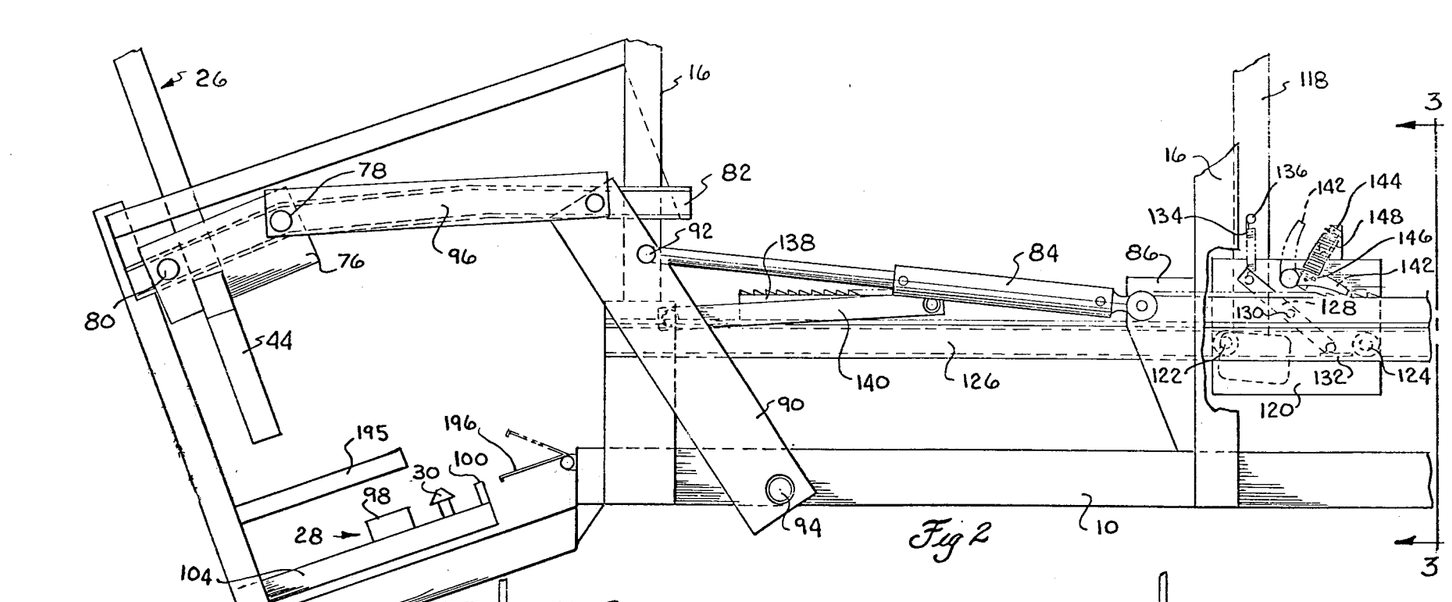
FIG. 2 is an enlarged fragmentary side elevational view of the load rack, transfer table, receiving table, and rolling rack assembly.

Turning to FIG. 2, it is seen that the transfer table 26 is adapted to move in a translatory manner from a first position adjacent the supporting box frame 24 (shown in solid lines) to a position adjacent the front end of the load rack 10, hereafter referred to as the second position. In particular, transfer table 26 is adapted to move with a carriage which includes a carriage plate 76 having a pair of longitudinally spaced rollers 78, 80 rotatively mounted thereto and confined within a pair of guide rails 82 which extend along each side of the wagon between the supporting box frame structure 24 and the forwardmost pair of upstanding posts 16. Carriage plate 76 is powered along the confines of guide rail 82 by a pair of double acting hydraulic cylinders, each indicated by numeral 84 and disposed on one side of the wagon and having an anchor end fixed to a mounting plate 86 which in turn is secured to a rearwardly spaced post 16. The rod end of the cylinder 84 is connected to a rocker arm 90 at point 92. Rocker arm 90 is adapted to pivot back and forth about a transverse axis 94 and is pivotally connected to carriage plate 76 by a connecting link 96. Therefore it is seen that as the cylinders 84 are retracted and extended, the carriage is actuated back and forth in guide rails 82 between said first and second positions.

Receiving Table

Figure 6:
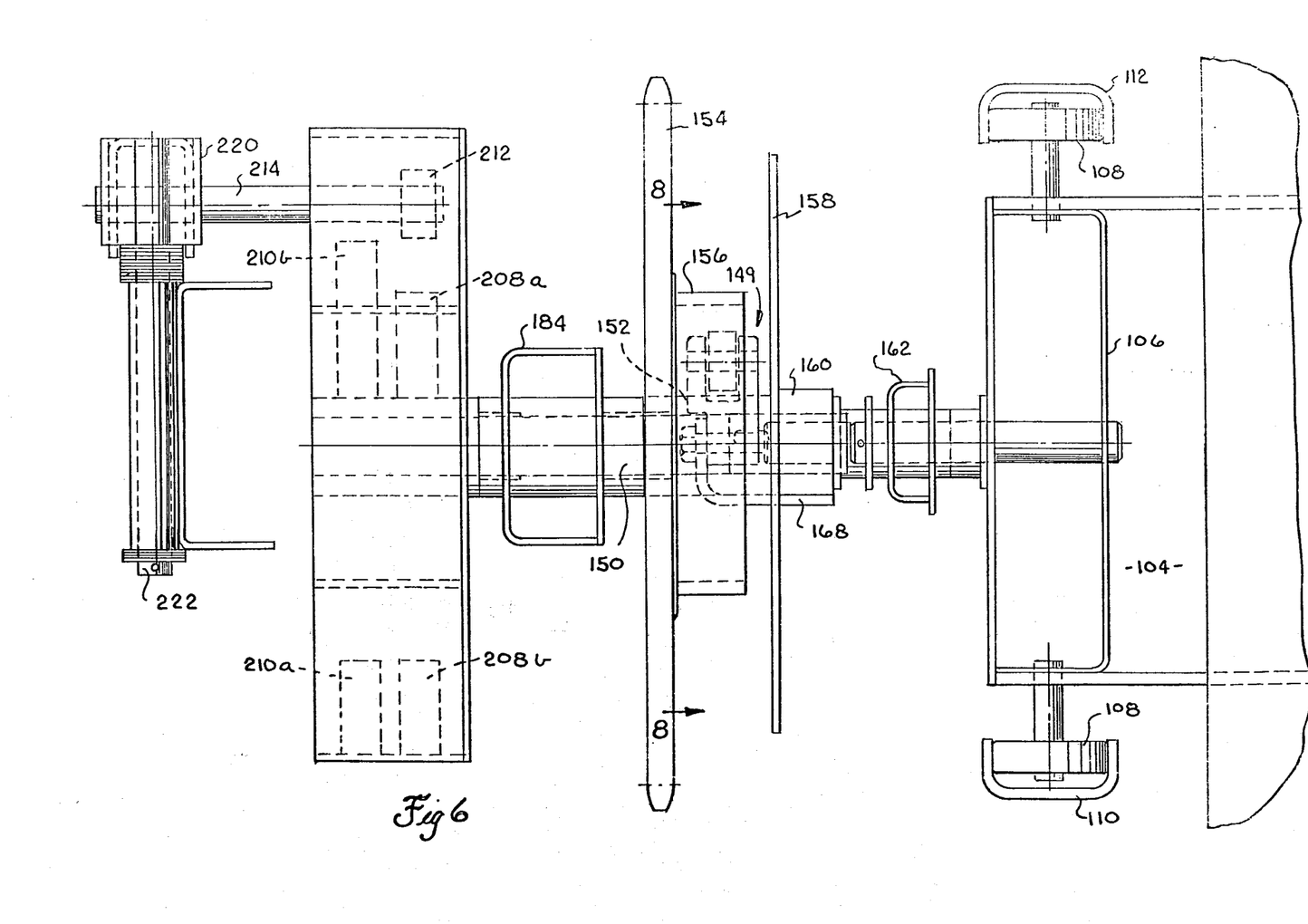
FIG. 6 is a plan view of the control system for actuating the receiving table and retaining means of the transfer table.
Figures 9, 10:
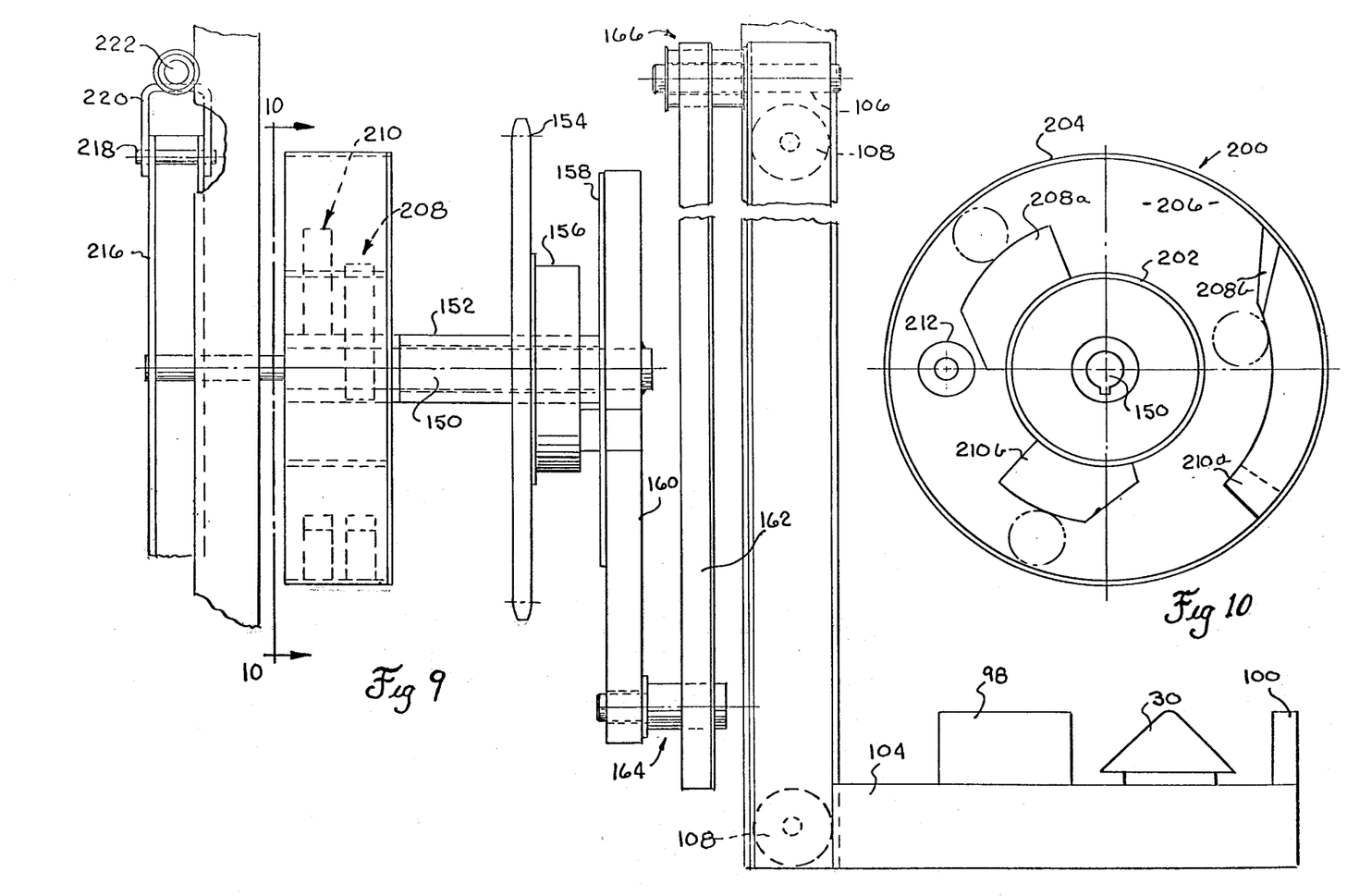
FIG. 9 is a fragmentary side elevational view of the control system shown in plan in FIG. 6.
FIG. 10 is a fragmentary side elevational view of the cam assembly for actuating the retaining means of the transfer table in timed relationship relative to the position of the receiving table.

Receiving table 28 is adapted to receive bales from pickup mechanism 32 and transfer them to the transfer table 26 during loading or to retrieve individual bales from the transfer table and convey them from the wagon, one bale at a time during unloading. Structurally, the receiving table 28 is comprised of transversely extending cross members 98, 100, the cross members being longitudinally spaced apart to accommodate conveying means 30 therebetween (FIG. 9). Cross members 98, 100 are secured to support member 104 which is in turn fixed to a carriage 106, as best seen in FIG. 6. Carriage 106 includes pairs of upper and lower rollers, each roller being indicated by the numeral 108 and confined within a pair of side guide rails 110, 112. Guide rails 110, 112 extend generally vertical but are slightly inclined fowardly so as to lie in a plane generally parallel with that assumed by the transfer table 28. Cross members 98, 100 extend in a plane generally normal to that of the carriage 106 and therefore as the carriage moves up and down within guide rails 110 and 112, cross members 98, 100 move vertically adjacent the rear face of transfer table 26.

Rolling Rack

Figure 3:
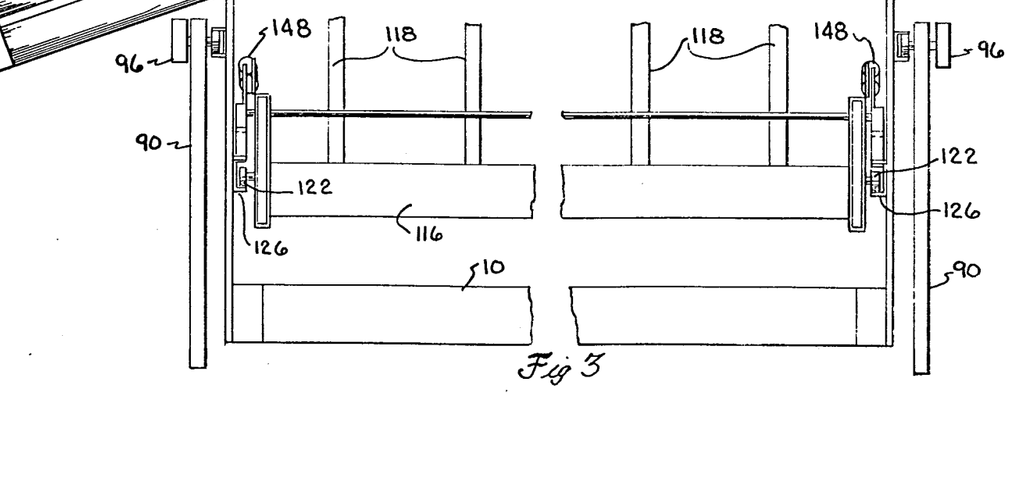
FIG. 3 is a view taken through the lines 3—3 of FIG. 2.

Rolling rack 22, shown generally in FIG. 1, is comprised of upper and lower transversely extending frame members 114, 116 and a plurality of vertical supports 118 laterally spaced and joined to the inner sides of the frame members 114, 116. Secured to the lower portions of the two outer supports 118 are a pair of carriage plates 120, each carriage plate including a pair of longitudinally spaced rollers 122, 124 (FIGS. 2 and 3) rotatively mounted thereto and confined within a pair of longitudinally extending guide rails 126 disposed on each of the load rack and spaced slightly thereabove. The carriage is provided with a mechanical brake and as best seen in FIG. 2 the brake includes an arm 128 pivotally mounted about axis 130. Fixed to the rear portion of arm 128 is a brake pad 132 which engages the lower rail portion of the left side guide rail 126 during the movement of the rolling rack and carriage along the load rack 10. Arm 128 is biased for braking by a spring 134 which extends from the forward upward portion of the arm to a point 136 slightly thereabove.

The rolling rack 22 is brought forward during unloading by a ratchet assembly which is operatively connected to the rolling rack carriage plate 120 and actuated by cylinders 84. The ratchet assembly, as best seen in FIG. 2, includes a ratchet bar 138 which extends nearly the entire length of the load rack on the left side of the wagon. Specifically, the lower edge of the ratchet bar 138 is slidably contained along the upper edge of the left side guide rail 126. The upper edge of the ratchet bar 138 includes a series of aligned, forwardly inclined serrated teeth. To provide back and forth reciprocation, the ratchet bar is connected to rocker arm 90 by a pivotal link 140. A pawl 142 is pivotally secured to the outer face of carriage plate 120 just above the serrated teeth of the ratchet bar 138 and is moveable from a ratchet engaged position, shown in solid lines FIG. 2, to a disengaged position shown in dotted lines of the same figure. To assure engagement and disengagement, a compression spring 144 is pivotally connected to pawl 142 by pin 146. The upper portion of spring 144 is pivotally connected to a tab 148 extending upwardly from carriage plate 120.

Receiving Table Drive and Cam Control for Hooks

With particular reference to FIGS. 6–10, it is seen that the receiving table forming a part of a present invention is mechanically driven through a pin and crank arrangement which is actuated by a single revolution clutch assembly, indicated generally by numeral 149. In particular, rotative motion is provided by a circular chain sprocket 154 driven by an outside source, not shown, which is fixed to a sleeve 152 that is rotatively mounted around drive shaft 150. The sprocket 154 is continuously driven and includes a clutch housing 156 disposed about its rear face. Spaced rearwardly of the chain drive sprocket 154 is a circular carrier plate 158 which is fixed by welds or other suitable means to drive shaft 150 and rotatable therewith. Fixed to the face of carrier plate 158 and depending generally downwardly therefrom is a carrier block 160 which is pivotally connected to crank 162 by lower pivot pin assembly 164. The upper portion of crank 162, as best seen in FIG. 9, is likewise pivotally connected to carriage 106 by pivot pin assembly 166. Thus as the carrier plate 158 is rotated about a single revolution, the carriage 106 is driven up to its maximum altitude and returned to its lower position.

Figures 7, 8:
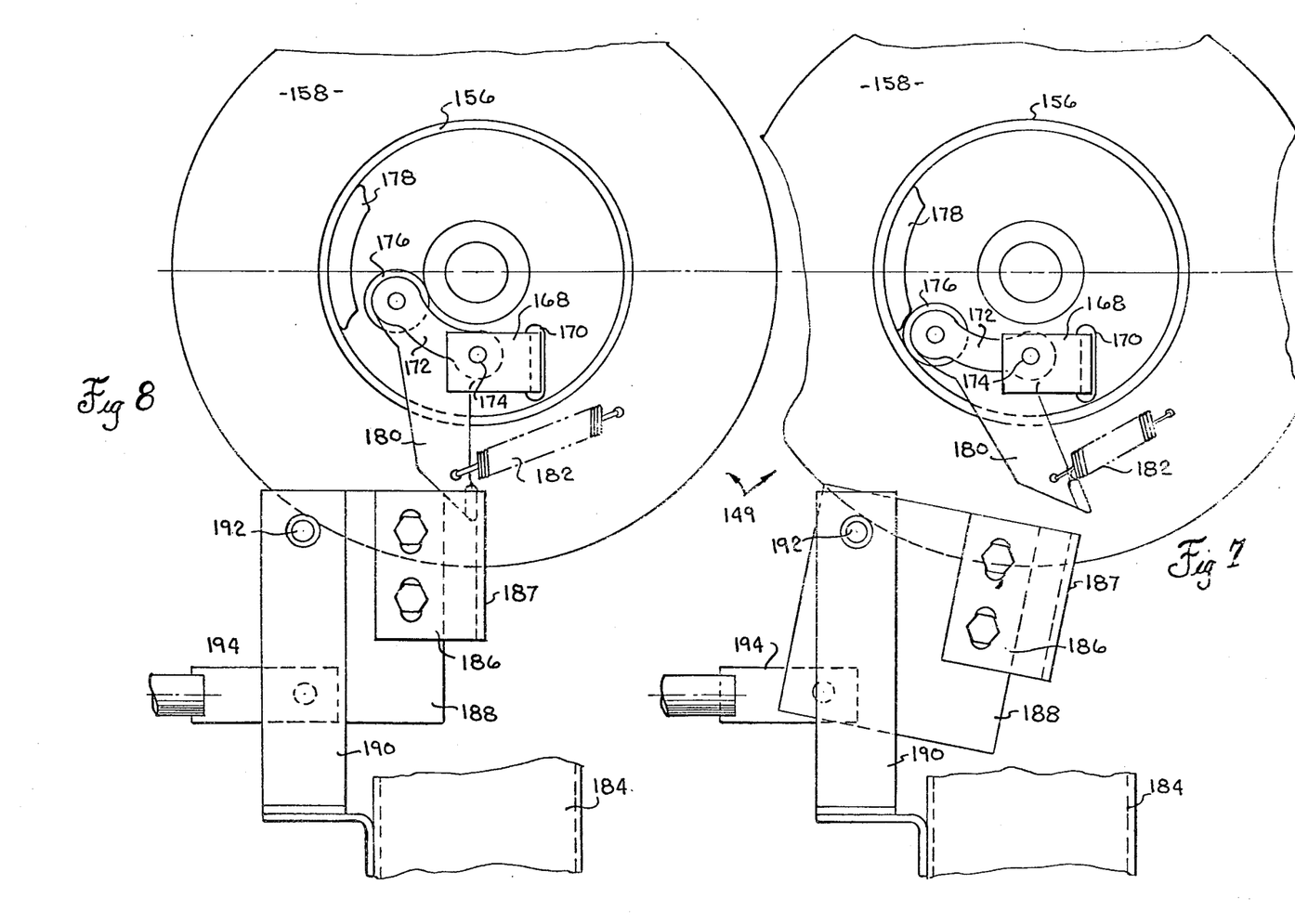

The carrier plate is actuated through a single revolution clutch 149 housed in clutch housing 156. As shown in FIGS. 6, 7 and 8, a finger 168 is fixed to one side of carrier block 160 and extends through an opening 170 of carrier plate 158 and curls inwardly adjacent the front face thereof. The clutch mechanism includes a pawl arm 172 pivotally connected at 174 to the curled end of finger 168 and further having a roller 176 disposed oppositely from the pivotal connection with finger 168. Disposed along the inside periphery of clutch housing 156 is a stop 178 which continuously runs with the chain sprocket 154. Extending downwardly from the pawl arm 172 is a lever arm 180 in which the lower end thereof is spring biased by spring 182 such that the roller end 176 tends to be pulled towards the periphery of clutch housing 156.

Disposed below the clutch housing 156 is an actuating mechanism for selectively actuating the clutch for engagement with stop 178. The actuating mechanism includes a mounting tab 190 fixed to support posts 184 and extending upwardly therefrom. A pivot plate 188 is fixed to the upper portion of mounting tab 190 and pivots back and forth about axis 192. Fixed to an outside upper edge of pivot plate 188 is a locking plate 186 which has an edge portion 187 which curls back for engagement with the lower end of lever arm 180. The pivot plate 188 is actuated back and forth by an actuating arm 194 which during loading is operatively connected to a two bale trip mechanism 195 (FIG. 2) disposed above the receiving table 28, opposite the pickup mechanism 32. During the unloading mode of operation, the actuating arm 194 is temporarily disconnected by means, not shown, from the trip mechanism 195 and is operatively connected to sensing plate 196 which is disposed transversely the front edge of the load rack 10 and senses the disposition of bales on the receiving table during unloading.

The opening and closing of the hooks during transfer between the transfer table 26 and receiving table 28 is controlled by a cam assembly 200, (FIG. 10), keyed to drive shaft 150 forwardly of the single revolution clutch assembly 149. Cam assembly 200 includes a hub 202 and a housing having a periphery band 204 and a back portion 206. Axially disposed within the cam assembly 200 is a first and second set of cams 208, 210. The first cam set 208 is spaced rearwardly of the second cam set 210 and is employed for loading and includes a hook opening cam 208a fixed to hub 202 and a hook closing cam 208b fixed to the inside of periphery bank 204.

Second cam set 210 is employed during unloading bales from the transfer table 26 to the receiving table 28 and includes a hook opening cam 210a and a closing cam 210b.

Figure 11:
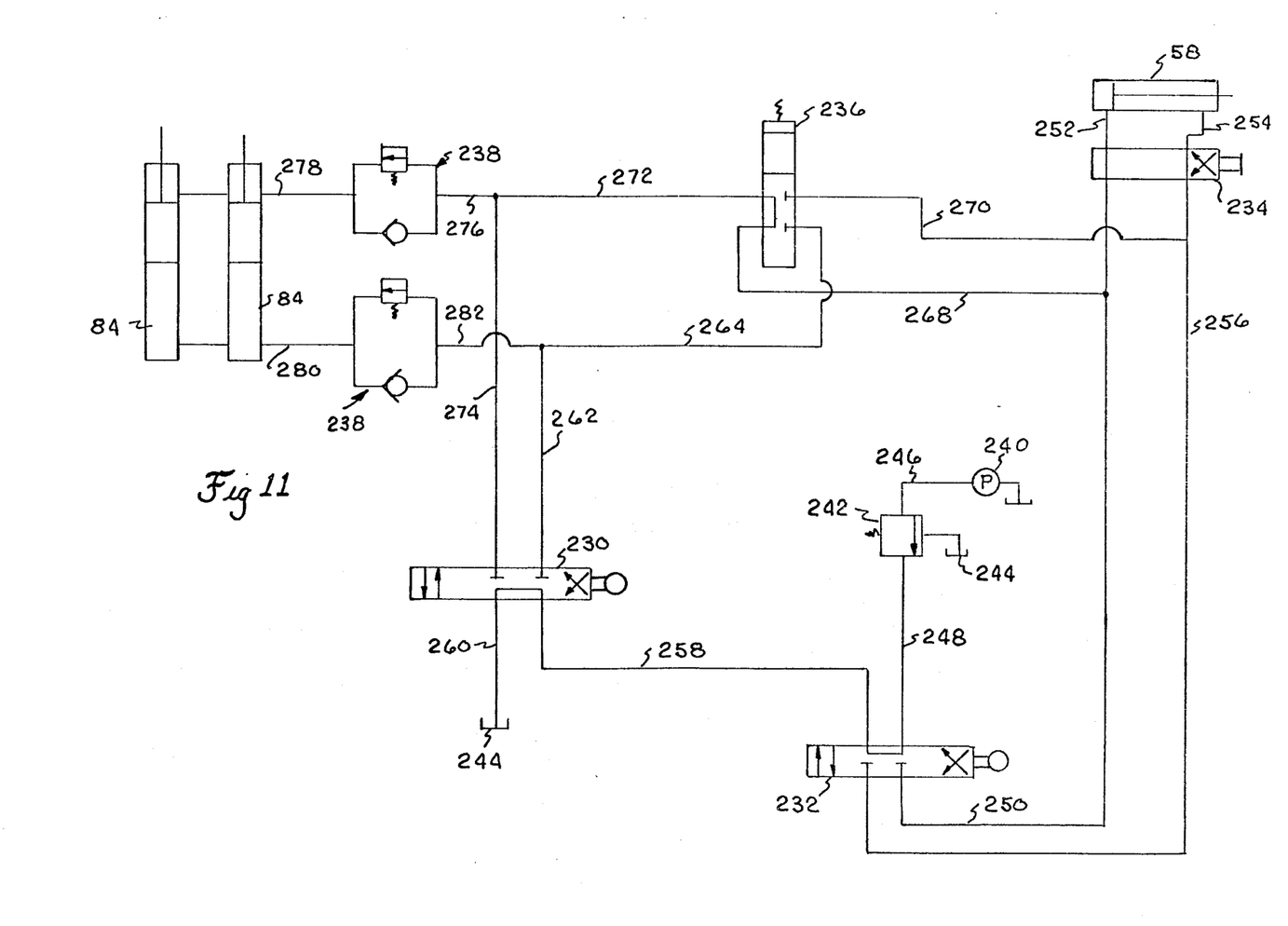
FIG. 11 is a schematic circuit diagram of the hydraulic system for controlling the various hydraulic powered components of the present invention.
Figure 12:
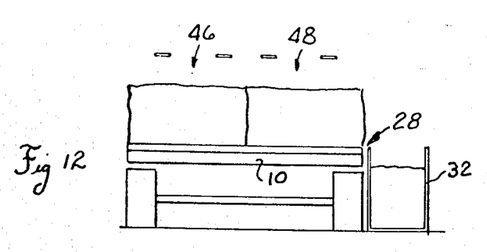
FIGS. 12–19 are schematic illustrations of the loading operation of the present bale wagon.
Figure 13:
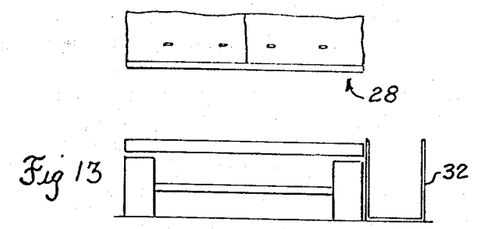
Figure 14:
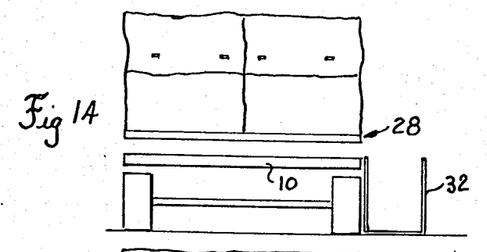
Figure 15:
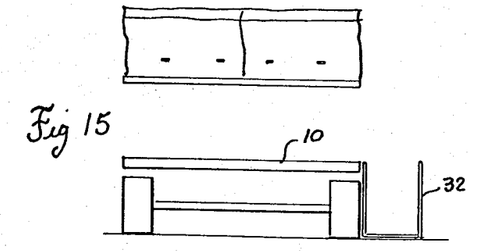
Figure 16:
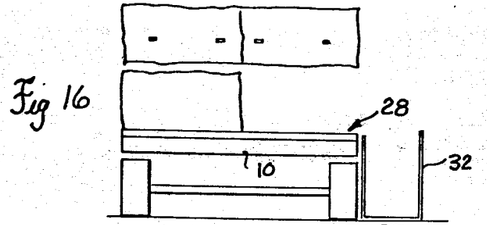
Figures 17, 19:
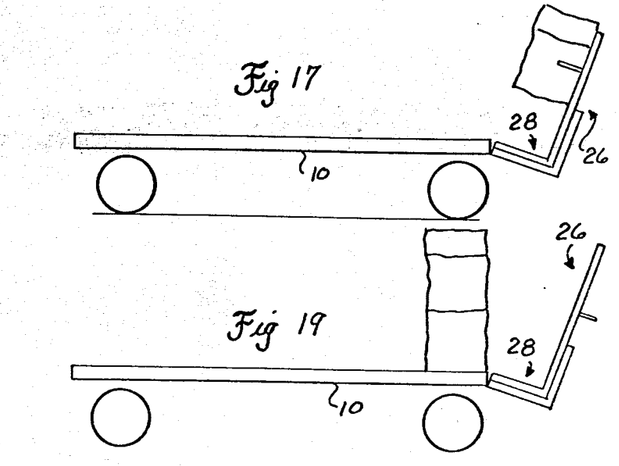
Figure 18:
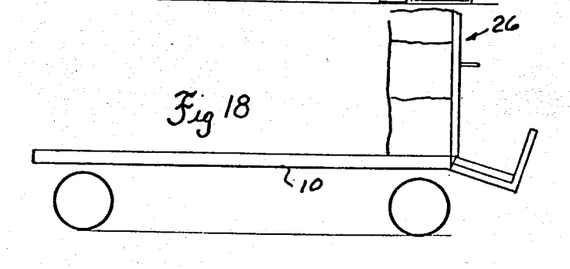
Figure 20:
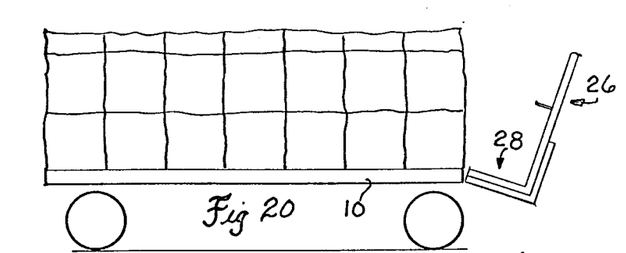
FIGS. 20–26 are schematic illustrations of the unloading operation of the present bale wagon.
Figure 21:
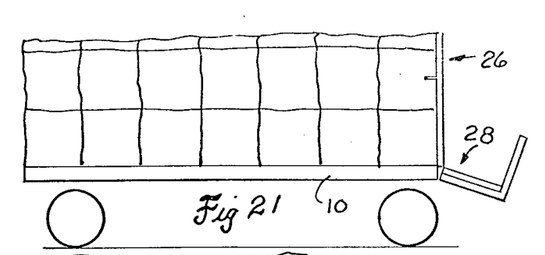
Figure 22:
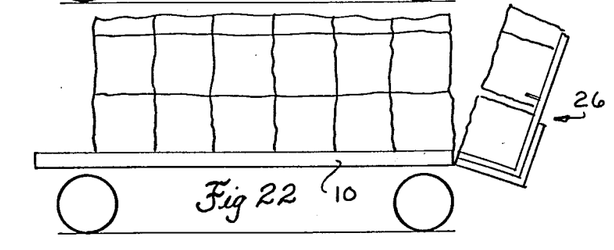
Figure 23:
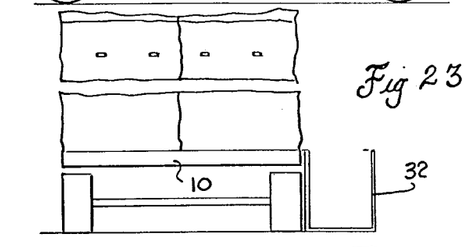
Figure 24:
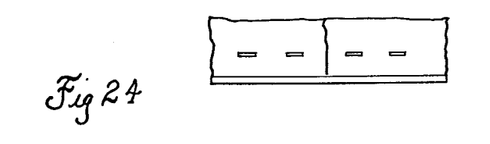
Figure 25:
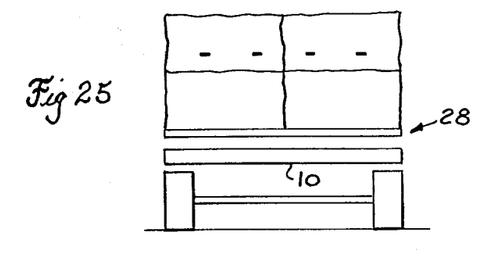
Figure 26:
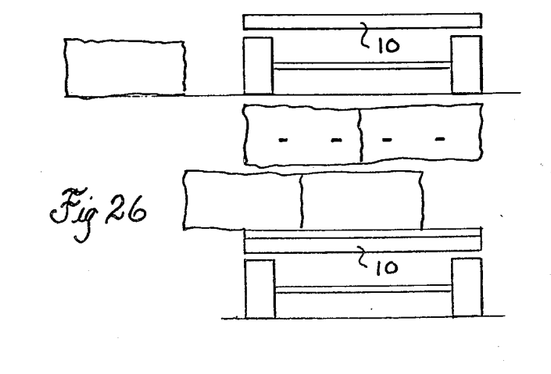

The control valve for controlling hook cylinder 58 is shown schematically in the hydraulic diagram of FIG. 11 (indicated by numeral 232). As shown therein, the valve 232 is of a three position type valve and is normally spring centered. For actuating the control valve 232, a roller 212 is fixed to the rear end of shaft 214 which is in turn fixed to swing arm 216 (FIG. 9). It is noted that as the cam assembly 200 rotates with drive shaft 150, the cams fixed on the hub and periphery of the cam assembly 200 causes roller 212 to oscillate back and forth, causing the swing arm 216 to pivot about longitudinal axis 218 which results in the actuation of the control valve 232 for controlling the hook cylinder 58. Swing arm 216 is pivotally connected to C-channel 220 which is in turn pivotally secured about transverse shaft 222. Thus to change from the loading to the unloading mode of operation the swing arm 216 is pivoted about transverse shaft 222 rearwardly until roller 212 is aligned with the second set of cams 210.

Loading Operation

The loading operation of the present invention is shown schematically in FIGS. 12–19. It may be noted that prior to loading the bale wagon, individual bales are discharged from a hay baler into the field, the bales being generally disposed in spaced apart relationship, longitudinally aligned. To load, the bale wagon is driven alongside the row of bales and individual bales are guided into the offset pickup mechanism 32. The pickup mechanism 32 engages the individual bales and conveys them onto the receiving table 28, the bales being disposed thereon in end-to-end relationship transversely of the bale wagon. Once two bales have been received on the receiving table 28, the bale disposed on the right side, opposite the pickup mechanism 32, actuates the two bale trip mechanism 195, which is operatively connected to link 194 (FIG. 7). As particularly seen in FIG. 7, the movement of link 194 to the left causes the roller 176 of the clutch assembly to engage stop 178 of the clutch housing 156. The engagement of the clutch assembly with stop 178 results in the rotation of carrier plate 158 and since carrier plate 158 is fixed to drive shaft 150, the drive shaft is rotated simultaneously. The rotation of carrier plate 158 drives crank 162 upwardly, raising receiving table 28 in the process. Once the carrier plate 158 has made approximately one-half revolution, the pivot pin assembly 164 will be at top dead-center and the receiving table will be at its maximum altitude. During the second half revolution the carrier plate 158 will pull crank 162 downwardly and bring the receiving table to its downward or lowermost position. Since cam assembly 200 is likewise fixed to drive shaft 150 it rotates as carrier plate 158 rotates. In the loading operation roller 212 is disposed in its rearmost position for selective engagement with the first set of cams 208a and 208b. It is noted from FIG. 10 that as the cam assembly begins to rotate the roller 212 engages cam 208a causing the hook cylinder to extend, thereby opening the hooks. As the cam assembly continues to rotate, roller 212 engages closing cam 208b at approximately the time the receiving table reaches its maximum altitude. This causes the hooks to close and engage the two bales disposed on the receiving table. Thus the drive shaft continues to make one half more revolution and then come to a stop. The stop is brought about by the fact that the trip mechanism is spring loaded such that after the two bales are raised to the hooked position the trip mechanism moves back to its initial position pushing link 194 to the right which causes edge 187 of the locking plate 186 to engage the lever 180, causing the roller to be pivoted from the path of stop 178, as seen in FIG. 8.

Two more bales are received on the transfer table in like manner and the trip mechanism once again actuates the single revolution clutch 149 causing the receiving table to move upwardly. Just as the receiving table begins to move upwardly cam 208a again opens the hooks at a time in which the top of the two bales on the receiving table is just below the lower portion of the two bales previously retained on the transfer table 26. Thus the opening of the hooks causes the previously retained pair of bales to be supported by the present pair of bales on the receiving table. As the receiving table continues to move up, the four bales are moved upwardly until the receiving table has reached approximately its maximum altitude at which time the hooks close, retaining the lower pair of bales. Thus it is seen that the hooks retain the last pair of bales and the previous pair of bales are supported thereabove in overlying relationship. As seen in FIG. 2, the hooks are spaced a distance slightly greater than a pair of bales above the receiving table 28. Thus once the transfer table 26 includes four pair of bales, there is yet room for another pair of bales on the receiving table 28. Thus two more bales are received in end-to-end relationship on receiving table 28. Once the four pair of bales are supported adjacent the transfer table 26 by the hooks a trip mechanism indicated by numeral 224 (FIG. 1) causes the trip mechanism 195 disposed adjacent the right hand side of the receiving table to be operatively connected to the control valve for the transfer table cylinders 84. Thus when the last two bales are received on the receiving table the trip mechanism 195 actuates the control valve of hydraulic cylinders 84 causing them to be retracted and the five pair of bales to be moved rearwardly onto the front part of load rack 10. As the transfer table 26 becomes disposed adjacent the load rack 10, the hooks are disengaged thereby depositing the tier on the front of the load rack. At approximately the same time, a trip mechanism which is operatively connected to the control valve for hydraulic cylinder 84 reverses the control valve, thereby extending the rod end of cylinders 84 and returns the transfer table back to its forward loading position. Successive tiers are loaded on the transfer table similar to that just described and the tiers are successively stacked in side-by-side relationship onto the load rack 10 until a full load is contained thereon.

Single Bale Unloading

After the bale wagon is loaded it is moved to an appropriate storage sight for single bale unloading. To unload it is necessary to deactivate the loading controls for the transfer table 26 and receiving table 28. This is accomplished by a manually operated central control lever, not shown, which when moved from a loading to an unloading position deactivates the loading controls and activates the unloading controls. The unloading controls include a system of sensing mechanisms, not shown, disposed about said transfer table 26 and operatively connected to the hydraulic control valve of the pair of cylinders 84. This system of sensing mechanisms sense the presence of the bales about the transfer table 26 and control the movement thereof between a first forward inclined position (also referred to as the single bale unloading position) and a second position (also referred to as a tier receiving position) adjacent the front end of load rack 10. As the central control lever is moved to the unloading position, a second major unloading control is also activated, that being the sensing plate 196 which is disposed intermediately between the load rack 10 and cross conveyor 30. The sensing plate 196, which as seen in FIG. 2 is disposed along a front edge of the load rack 10, when activated is spring biased to an upward position and is operatively connected to the single revolution clutch assembly for driving the receiving table up and down relative to the hooks on transfer table 26.

To complete the conversion from loading to unloading, pawl 142 which is pivotally secured on the rolling rack carriage plate 120 is moved to the lower position for engagement with the ratchet portion of ratchet bar 138. This assures that the rolling rack 22 will be moved forwardly in increments equal to a tier thickness as the transfer table is moved from the second position (tier receiving position) adjacent the front end of the load rack 10 to the first or forward inclined position.

Parenthetically, it should be noted that the unloading control linkage contains interlocking means to prohibit the simultaneous actuation of transfer table 26 and receiving table 28.

To commence the unloading operation, the transfer table 26 is powered to the second position adjacent the front end of load rack 10. Once the transfer table 26 is disposed adjacent the front end of load rack 10, the hooks are closed retaining the second row of bales from the bottom of the tier. The transfer table 26 is then actuated forwardly, carrying the upper portion of the tier therewith. As the transfer table 26 is moved forwardly, ratchet bar 138 which is engaged with pawl 142 causes the rolling rack to be moved forwardly an increment equal to one tier thickness. As the rolling rack moves forwardly the bottom row of the tier being retrieved is pushed forwardly onto the receiving table 28. The cross conveyor 30, which is mechanically driven, conveys the two bales transversely from the bale wagon, toward the side of the wagon opposite the pickup 32 where the bales fall therefrom, one bale at a time. Once the bottom two bales of the tier have been conveyed from the cross conveyor, the sensing plate 196 springs upwardly and actuates the single revolution clutch which drives the receiving table 28 upwardly towards the bottom two bales disposed on transfer table 26. As the receiving table 28 moves upwardly it is noted that the cam assembly 200 is rotated by drive shaft 150. It also should be pointed out at this time that roller 212 is now aligned for engagement with the second set of cams 210. Therefore as the receiving table 28 moves upwardly to a point just before it reaches its maximum altitude, cam 210a engages the roller 212 which actuates the hook control valve, causing the hook cylinder to extend, opening the hooks and allowing the lower pair of bales retained thereby to be deposited on the receiving table 28. As the receiving table 28 moves downwardly the cam assembly 200 also continues to rotate and cam 210b engages roller 212 just before the receiving table reaches its lower position, causing the hooks to close and retain the pair of bales disposed above the pair of bales now disposed on the receiving table 28.

The pair of bales retrieved from the transfer table are then conveyed transversely from the wagon by cross conveyor 30, the bales being discharged in single file relationship, one bale at a time. Once the bales have been completely discharged from the receiving table, the sensing plate 196 springs upwardly, causing the receiving table to cycle and retrieve the lower pair of bales presently being retained by the hooks 46, 48 as just described.

Once the complete tier has been retrieved by the receiving table 28, the transfer table 26 moves back to the second position to retrieve another tier. This process of retrieving a tier from the load rack and bringing it back to the first position and then retrieving individual pairs of bales from the tier and conveying them transversely from the bale wagon is continued until the entire load is discharged from the load rack 10.

Once the entire load is discharged, the central control lever is shifted to the loading position and deactivates the unloading controls and activates the loading controls and enables the bale wagon to return to the field and load a stack as previously described.

Hydraulic System

FIG. 11 shows schematically the hydraulic circuitry for controlling the loading and unloading operation of the bale wagon. From the foregoing discussion it is apparent that the basic power units of the hydraulic system comprise (1) a pair of side mounted cylinders, each denoted by the numeral 84, for powering the transfer table 26 and rolling rack 22 and (2) the hook control cylinder 58. These power units are shown in the hydraulic diagram and are primarily controlled through a pair of three position directional control valves indicated by numerals 230 and 232, valve 230 being operatively connected to the parallel cylinders 84 while valve 232 is operatively connected to the hook control cylinder 58.

Referring generally to the structure of the hydraulic circuitry, a pair of combination relief-check valves 238 are inserted in the hydraulic system between the second table control valve 230 and the parallel arranged cylinders 84. Interposed between cylinder 58 and control valve 232, is a cross-over valve 234 which is manually operated by the central control lever, not shown, which changes the mode of operation of the bale wagon from loading to unloading. Various lines and other components of the hydraulic system are indicated by numerals for the purposes of explaining the function of the hydraulic circuit during loading and unloading.

In the aforementioned description of the loading and unloading operation it is observed that the control of the hooks on the transfer table is accomplished by cam assembly 200. This cam assembly is operatively connected to the control valve 232 and effectuates the placement of bales from the receiving table 28 to the transfer table 26 or effectuates the release of bales from the same transfer table to the receiving table. But during the loading operation it was further necessary to control the opening and closing of the hooks when the transfer table 28 was disposed in its second position adjacent the front end of the load rack 10. To accomplish this a secondary hook control valve 236 is inserted in the hydraulic system between the hook controls cylinder 58 and the parallel disposed cylinders 84. As seen in FIG. 11, which shows all of the components of a hydraulic system as they are disposed in the no load condition, the secondary hook control valve is a two position valve, the two positions being (1) a block position and (2) a straight-through position. Preferably the secondary hook control valve 236 is spring biased to assume the straight-through position but is mounted between the transfer table and the box frame such that it assumes the block position when the transfer table is in its forward inclined position. Thus as the receiving table moves rearwardly the secondary control valve assumes the straight-through position because it is spring biased accordingly.

Briefly discussing the function of the hydraulic system during the operation of the bale wagon, it is seen that in the no load condition, oil flows from the pump 240 through line 246, through relief-valve 242, through the center position of control valve 232, and onto reservoir 244.

During the loading operation pairs of bales are transferred from the receiving table 28 to the transfer table 26 where the bales are retained thereon by the hooks 46, 48. As the receiving table begins to move upward cam 208a (FIG. 10) shifts control valve 232 to the straight-through position. Thus oil flows from the pump through line 250 and 252 into the anchor end of cylinder 58, causing the rod to extend and open the hooks. Once the receiving table has moved up to near its maximum altitude, cam 208b shifts the control valve 232 to the cross-over position. The cross-over position directs the flow of oil from pump 240 into the rod end of cylinder 58, thereby closing the hooks and retaining the pair of bales previously supported by the receiving table 28. This is repeated until a full tier is supported by the hooks 46 and 48.

After the full tier has been received by the transfer table, a trip mechanism actuates the transfer table control valve 230 to the cross-over position. Oil then flows from the pump through the normally centered position of control valve 232, through control valve 230, into line 274. At this point the oil would tend to flow through secondary control valve 236 except for the fact that the cylinder 58 is extended and line 250 is blocked at control valve 232; thus oil is not free to flow into line 272 and pressure is built up therein. Once pressure build-up reaches the predetermined limits of the relief-valve 238, oil flows into the rod end of each of the cylinders 84, retracting the cylinders and pulling the transfer table rearwardly towards a position adjacent the front end of load rack 10. As the transfer table 26 moves rearwardly, the secondary hook control valve 236 is shifted to its straight-through position. Thus once the cylinders 84 are fully retracted and adjacent the front end of load rack 10, the oil in line 274 is allowed to flow through the secondary hook control valve 236 into the anchor end of cylinder 58; thus opening the hooks and depositing the entire tier onto the front portion of the load rack 10. Then a trip mechanism shifts transfer table control valve 230 over to the straight-through position. Oil then flows into line 262 and since cylinder 58 is extended and line 250 is blocked at valve 232; the oil flows into line 282 through the relief-check valve combination 238 and into the anchor end of cylinders 84. The cylinders 84 are extended causing the transfer table 26 to be moved back to its receiving position for receiving another tier from the receiving table. The process of forming a tier on the transfer table and moving the transfer table back and forth between the load rack and the first position is continued until a full load is received thereon.

To unload it is recalled that the central control lever is shifted from the loading position to the unloading position. The cross-over valve 234 is operatively connected to the central control lever and as the control lever is shifted to the unloading position the cross-over valve is shifted to the cross-over position.

The unloading operation is commenced by a tripping mechanism which shifts the transfer table control valve 230 to the straight-through position. Oil then flows through control valve 232, through control valve 230 and into line 274. Flow is blocked in line 272 because the cylinder 58 is in a retractive position and line 250 is blocked at control valve 232. Therefore oil flows into the relief portion of the upper relief-check valve 238 once the predetermined pressure range is reached. The oil flows from the combination relief-check valve 238, into line 278 and into the rod end of cylinders 84, thereby retracting the cylinders and bringing them rearwardly to the second position adjacent the front end of the load rack 10. Once the cylinders are completely retracted the transfer table 26 is adjacent the front end of the load rack in close proximity to the end tier of bales. As the transfer table moves to this position adjacent the load rack 10, the secondary control valve 236 is shifted to the straight-through position. Since the oil can no longer flow into the rod end of cylinders 84, the oil flows back through line 272, through the crossover valve 234, into the anchor end of cylinder 58. This extends the rod of cylinder 58, causing the hooks to close and retain the second row of bales from the bottom of the tier. Then the second table control valve 230 is shifted to the straight through position and oil flows into line 262. The oil flow is restricted in line 264 since the cylinder 58 is fully retracted and line 250 is blocked at control valve 232. Therefore once the predetermined pressure range is reached oil flows from line 262, through line 282, through the relief portion of the combination relief-check valve, into the anchor end of cylinders 84. The rods of the respective cylinders 84 are then extended, causing the transfer table 26 to move from the position adjacent the load rack to the first forward inclined position, carrying the retrieved tier therewith. It is noted at this point that the bottom row of bales of the retrieved tier is then pulled down onto the receiving table 28 by the movement of the rolling rack a distance forward equal to one tier thickness. Once the transfer table is brought back to its first position, the second table control valve 230 is shifted to its neutral or block position.

The cross conveyor 30 then conveys the lower pair of bales from the receiving table 28, one bale at a time. At this time the sensing plate 196 springs upwardly and actuates the single revolution clutch assembly 149 which in turn actuates the cam assembly 200. As the receiving table 28 moves upwardly control valve 232 is shifted to the cross-over position by cam 210a just before the receiving table reaches its maximum altitude. Thus oil flows into line 256, through the crossover valve 234, into the anchor end of cylinder 58. Therefore the rod of the cylinder is extended causing the hooks to open and release the lower pair of bales retained on transfer table 26. As the receiving table moves downwardly, cam 210b moves control valve 232 to the straight-through position. Thus oil flows into line 250, through cross-over valve 234 and into the anchor end of cylinder 58. As the rod of cylinder 58 is retracted the hooks are closed. The positioning of cam 210b is critical inasmuch as it is necessary that the hooks close as the tier of bales slide down the transfer table just before the receiving table reaches its lowermost position. The cycling of the receiving table 28 is continued until all of the bales on the transfer table have been retrieved and conveyed transversely from the bale wagon. Once all of the bales have been retrieved, the transfer table 26 is once again moved rearwardly to the second position adjacent the load rack 10 where it retrieves another tier that was brought forward on its last cycle by the rolling rack 22. The transfer table then returns the tier to the first position where the receiving table goes through a series of cycles to retrieve individual pairs of bales from the receiving table. This total process is continued until the entire wagon is unloaded.

Thus it is seen that the present bale wagon had the advantage of employing the same stacking elements to load and single bale unload. This gives a very desirable design arrangement that no other bale wagon in the prior art includes in that the same stacking components are used to unstack and single bale unload without the addition of any type of conversion unit to adapt the bale wagon to perform in unloading situations.

The terms, "upper," "lower," "forward," "rearward" etc., have been used herein merely for the convenience of the foregoing specification and in the appended claims to describe the bale wagon and its parts as oriented in the drawings. It is to be understood, however, that these terms are in no way limiting to the invention since the bale wagon may obviously be disposed in many different positions when in actual use.

The present invention, of course, may be carried out in other specific ways than those herein set forth without departing from the spirit and esential characteristics of the invention. The present embodiments are, therefore, to be considered in all respects as illustrative and not restrictive, and all changes coming within the meaning and equivalency range are intended to be embraced herein.

Having thus described our invention, what we claim is:

1. A bale wagon adapted for loading and unloading bales of hay or the like, comprising in combination:
    a load rack for supporting a stack of bales, said stack being comprised by side-by-side tiers;
    a generally upright transfer table normally disposed in a first position spaced forwardly of said load rack and movable between said first position and a second position in which said transfer table is disposed adjacent a front end of said load rack for delivering said tiers in succession to said load rack during loading and for receiving said tiers in succession from said load rack during unloading;
    a carriage means disposed below said transfer table and adjacent said front end of said load rack;
    a bale receiving table fixed to said carriage means;
    a mechanical drive for moving said carriage means and thereby said receiving table up and down relative to said transfer table for delivering bales thereto to load bales and for receiving bales therefrom to unload bales, said mechanical drive comprising: a drive shaft, a drive disc fixed to said drive shaft, and a crank pivotally connected at one end to a peripheral point of said disc and pivotally connected at the other end to said carriage means, whereby the selective rotation of said drive shaft cycles said carriage means and thereby said receiving table up and down;
    bale retaining means disposed on said transfer table and being operative to transfer bales from said receiving table to said transfer table to form said tier of bales thereon during loading when said transfer table is at its first position and to transfer bales from said transfer table to said receiving table during unloading when said transfer table is at its first position, said retaining means further being operative to transfer a tier to the front end of said load rack from said transfer table upon the movement of said transfer table to said second position during loading and to transfer a like tier from the front end of said load rack to said transfer table upon the movement of said transfer table to said second position during unloading; and
    conveying means disposed adjacent said receiving table for carrying bales received thereon from said wagon.

2. A bale wagon as set forth in claim 1 wherein means are provided for actuating said retaining means in timed relationship to the up and down movement of said receiving table, said actuating means comprised of a cam assembly having first and second cam means fixed to said drive shaft and rotatable therewith, said first cam means being operative during loading while said second cam means is operative during unloading.

3. A bale wagon as set forth in claim 2 wherein said cam assembly includes a housing and hub portion which is fixed to said drive shaft and wherein each of said cam means includes a pair of cams, one fixed to said hub and the other disposed radially therefrom within the housing.

4. A bale wagon as set forth in claim 2 wherein said drive shaft is selectively actuated by a single revolution clutch assembly.

5. A bale wagon as recited in claim 1 wherein said retaining means comprises a plurality of hooks disposed along a lower level of said transfer table for engaging a row of bales and supporting a plurality of rows thereabove in overlying relationship.

6. A bale wagon as set forth in claim 5 wherein control means are provided for actuating said hooks in time relationship to the up and down movement of said receiving table, during loading said control means being operative to (1) open said hooks as said receiving table moves upwardly and (2) close said hooks as said bales disposed on said receiving table reach an altitude adjacent said hooks, during unloading said control means being operative to (1) open said hooks once said receiving table has reached an altitude near the underside of the lower row of bales being retained and (2) close said hooks once the row above the lowermost row has dropped to an altitude adjacent the hooks.

* * * * *